United States Patent [19]

Schmidhammer et al.

[11] Patent Number: 4,986,975

[45] Date of Patent: Jan. 22, 1991

[54] PROCESS FOR PURIFYING HYDROGEN CHLORIDE FROM PYROLYSIS OF 1,2-DICHLOROETHANE

[75] Inventors: Ludwig Schmidhammer, Haiming; Peter Hirschmann; Klaus-Peter Mohr, both of Burghausen; Hermann Klaus, Marktl; Franz Haunberger, Burghausen, all of Fed. Rep. of Germany

[73] Assignee: Wacker-Chemie GmbH, Munich, Fed. Rep. of Germany

[21] Appl. No.: 348,283

[22] Filed: May 5, 1989

[30] Foreign Application Priority Data

May 26, 1988 [DE] Fed. Rep. of Germany ....... 3817938

[51] Int. Cl.$^5$ .......................... B01D 53/36; C01B 7/07
[52] U.S. Cl. .................................... 423/488; 423/241; 423/245.1
[58] Field of Search ...................... 423/488, 245.1, 241

[56] References Cited

U.S. PATENT DOCUMENTS

| | | | |
|---|---|---|---|
| 1,262,769 | 4/1918 | Garnes et al. | 423/245.1 |
| 1,908,312 | 5/1933 | Britton et al. | 423/245.1 |
| 4,018,880 | 4/1977 | Correia et al. | 423/488 |
| 4,035,473 | 7/1977 | Urioste et al. | 423/488 |
| 4,388,278 | 6/1983 | Schmidhammer et al. | 423/488 |
| 4,528,174 | 7/1985 | Schmidhammer et al. | 423/488 |
| 4,839,153 | 6/1989 | Schmidhammer et al. | 423/488 |

Primary Examiner—Jeffrey E. Russel
Attorney, Agent, or Firm—Burgess, Ryan & Wayne

[57] ABSTRACT

The invention is a multi-stage process for purifying hydrogen chloride containing acetylene and ethylene, from pyrolysis of 1,2-dichloroethane to provide highly pure hydrogen chloride for use in the preparation of silicon compounds. In the first stage, unsaturated by-products are chlorinated by reaction with an excess of chlorine gas. In the second stage, the unreacted chlorine gas remaining in the hydrogen chloride is reacted with an excess of defined olefins or chloroolefins and the hydrogen chloride is separated from the chlorination products and the excess olefins or chloroolefins by low-temperature rectification under pressure.

4 Claims, 1 Drawing Sheet

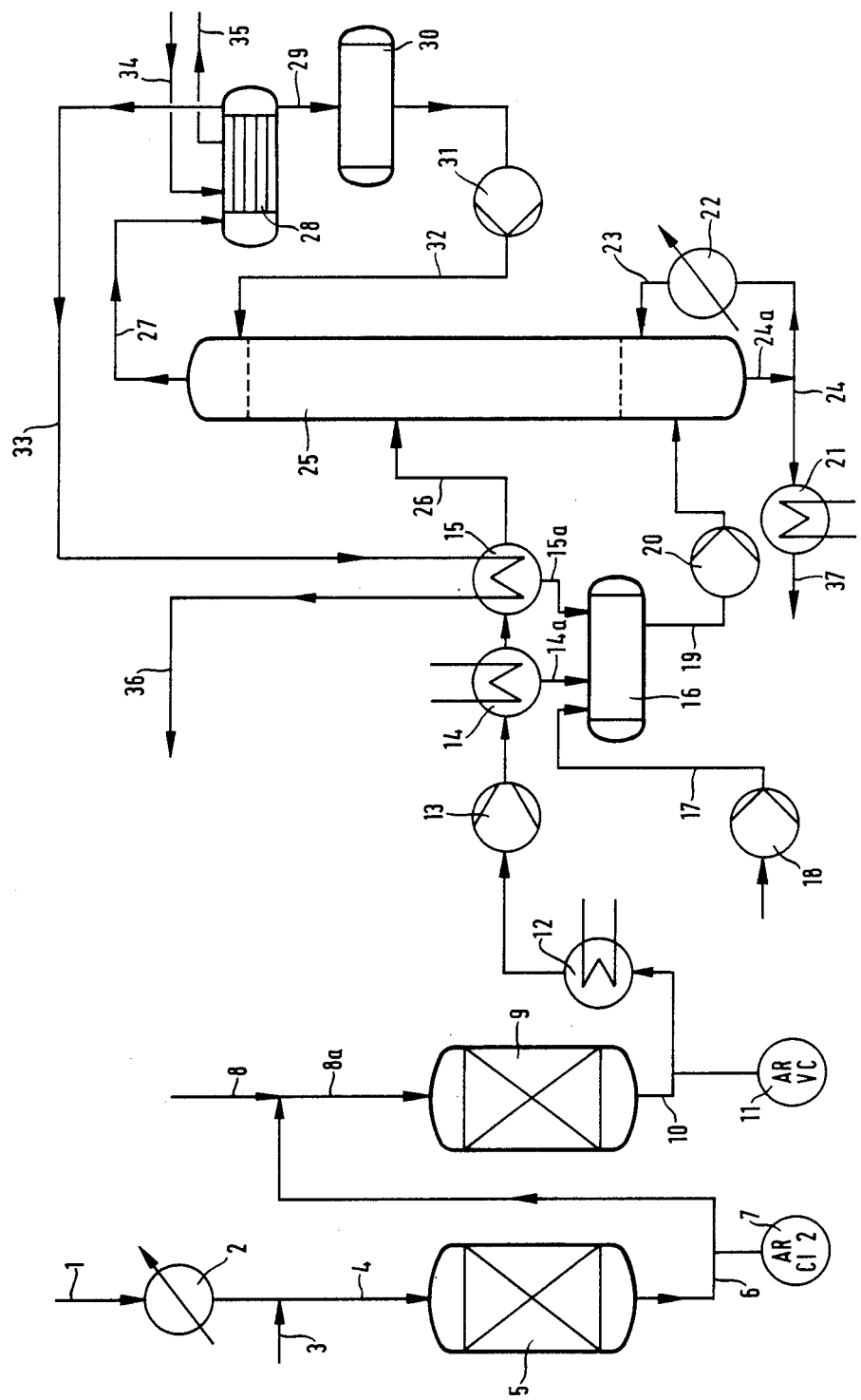

PROCESS FOR PURIFYING HYDROGEN CHLORIDE FROM PYROLYSIS OF 1,2-DICHLOROETHANE

BACKGROUND OF THE INVENTION

1. Field of the Invention

The invention is a three-stage process for removing acetylene and ethylene from hydrogen chloride from pyrolysis of 1,2-dichloroethane.

In large scale industrial processes for the production of vinyl chloride by pyrolysis of 1,2-dichloroethane, large quantities of hydrogen chloride are produced. The hydrogen chloride is contaminated with 0.05 to 0.5 mol % of acetylene and 0.005 to 0.05 mol % of ethylene. After removal of the acetylene by selective hydrogenation over platinum metal catalysts or platinum metal oxide catalysts to convert the acetylene to predominantly ethylene, the hydrogen chloride is usually employed for the oxychlorination of ethylene to give 1,2-dichloroethane (DE-A 2,353,437, DE-B 1,568,679=GB A 1,090,499 and DE-A 3,043,442=U.S.A 4,388,278).

With increasing interest in silicon chemistry, the hydrogen chloride demand is also increasing (preparation of trichlorosilane as the starting material for the chemistry of highly pure silicon, or preparation of methyl chloride for reaction with silicon as a starting material for preparation of silicon containing compositions). Even though various sources of hydrogen chloride are known, hydrogen chloride from the pyrolysis of 1,2-dichloroethane, for the production of vinyl chloride represents a particularly economical and always available raw material source for hydrogen chloride. A disadvantage of this hydrogen chloride is that the impurities resulting from the process such as acetylene or its partial hydrogenation product ethylene, as well as hydrochlorination products and decomposition products which are formed in the acetylene removal process, remain in the hydrogen chloride (vinyl chloride, ethyl chloride, ethane, (un)-saturated $C_4$-hydrocarbons) and cause extremely serious interference, even in the concentration range of ppm by volume, in the synthesis of the intermediates for the preparation of silicon containing compositions.

2. Statement of Related Art

High purity hydrogen chloride can be obtained by combustion of chlorine in a stream of hydrogen. This synthetic hydrogen chloride is very expensive and generally contains an excess of hydrogen.

A further possibility for producing high purity hydrogen chloride is based on purifying contaminated hydrogen chloride from pyrolysis of 1,2-dichloroethane by absorption in azeotropic hydrochloric acid, while blowing with air as the stripping gas. The hydrogen chloride is removed by subsequent thermal desorption from concentrated hydrochloric acid. However, this process is very expensive and involves enormous corrosion problems, and overall is generally uneconomical.

U.S. Pat. No. 3,923,963 discloses a process for purifying hydrogen chloride in which unsaturated hydrocarbon compounds or chlorohydrocarbon compounds are removed by reacting these compounds with at least stoichiometric quantities of chlorine in an activated carbon bed at not less than 80° C. and under pressure from 45 to 11.5 bar. The content of chlorinated by-products and excess chlorine is reduced in each case to less than 1 ppm by adsorption on the activated carbon. The disadvantage of this process is that the activated carbon must be regenerated by desorption. The activity of the activated carbon decreases rapidly. Because of the residual chlorine content, the hydrogen chloride treated in this way cannot be used to prepare silicon compounds which require pure hydrogen chloride.

In DE-A 3,508,371, a two step process for purification of pyrolysis hydrogen chloride, after acetylene removal by hydrogenolysis, is disclosed. The ethylene is catalytically hydrogenated to ethane in the first stage and in the second stage, the hydrogen chloride is freed of hydrochlorination products and decomposition products by pressure rectification at low temperatures. The disadvantage of this purification process is that the hydrogen chloride purified in this way contains ethane and excess hydrogen as an inert gas so that environmental problems and condensation problems arise.

It is therefore an object of the present invention to provide an economical process for purifying hydrogen chloride from pyrolysis of 1,2-dichloroethane, which process is satisfactory with respect to the purity and inert gas content.

BRIEF DESCRIPTION OF THE INVENTION

According to the present invention, ethylene dichloride pyrolysis hydrogen chloride is purified without problems of purity, environment, or inert gas. The process of the invention comprises a two stage, heterogeneously catalyzed chlorination reaction with subsequent low-temperature and pressure rectification of the reaction mixture from the chlorination reaction. Impurities, particularly those which interfere in silicone chemistry can be virtually quantitatively separated from the hydrogen chloride without formation of inert gas.

The invention relates to a multi-stage process for purifying a hydrogen chloride mixture containing acetylene and ethylene, preferably from pyrolysis of 1,2-dichloroethane which comprises:

(a) reacting the hydrogen chloride mixture at a temperature of from about 120 to about 220° C. at a pressure from about 5 to about 20 bar absolute in a first adiabatic reaction zone in contact with a catalyst comprising activated carbon impregnated with at least one transition metal chloride, with chlorine gas in an amount to form at the reactor exit hydrogen chloride reaction mixture containing from about 100 to about 2000 ppm by volume free chlorine, and (b) reacting the hydrogen chloride reaction mixture in a second diabatically operated reaction zone at a temperature of from about 80 to about 180° C. with olefins or chloroolefins which are gaseous under atmospheric pressure and boil under atmospheric pressure in a temperature range from about −50° C. to about +10° C. in contact with activated carbon impregnated with at least one transition metal chloride in an amount that the hydrogen chloride leaving the reaction zone contains from about 100 to about 1500 ppm by volume of these olefins or chloroolefins, and (c) rectifying the hydrogen chloride leaving the reaction zone in a column under a pressure from about 7 to about 15 bar, the hydrogen chloride being partially condensed at the top of the column and returned as reflux to the column, and the temperature at the bottom of the column being maintained at about 50 to about 80° C. The purified hydrogen chloride leaves the column preferably as a gaseous stream.

BRIEF DESCRIPTION OF THE DRAWINGS

The Figure is a schematic representation of a process of the invention.

DETAILED DESCRIPTION OF THE INVENTION

In the first stage of the process according to the invention, the unsaturated by-products in the hydrogen chloride from the pyrolysis of 1,2-dichloroethane, especially acetylene and ethylene, are virtually fully chlorinated to the corresponding saturated and unsaturated chlorohydrocarbons by means of an excess of chlorine in the presence of a catalyst. The reaction takes place under adiabatic conditions at pressures from about 5 to about 20 bar absolute and a temperature from about 120 to about 220° C., preferably, about 150 to about 170° C. The chlorine excess is adjusted such that the reaction mixture after the chlorination has taken place, contains from about 100 to about 2000 ppm by volume, preferably, about 800 to about 1200 ppm by volume, of chlorine.

Transition metal chlorides impregnated on activated carbon are the active components of the catalyst. Examples of transition metal chlorides include chromium(III) chloride, cobalt(II) chloride, lanthanum(III) chloride, nickel(II) chloride, iron(III) chloride, copper(II) chloride and manganese(II) chloride or mixtures of these compounds. Preferably, a mixture of copper(II) chloride and manganese(II) chloride on activated carbon is employed. The catalyst preferably comprises up to about 40% by weight of transition metal chloride based on the weight of activated carbon.

Suitable support material comprises activated carbon having a specific surface area from 500 to 2000 m$^2$/g. Other support materials such as alumina, silica gel, aluminum silicates and the like are not suitable since the chlorination of acetylene proceeds only incompletely. Surprisingly, promoters generally useful in chlorinations have a retarding action in the process according to the invention.

In a preferred embodiment of the catalyst, activated carbon as the support material is therefore impregnated with from about 10 to about 20% by weight of copper(II) chloride and from about 10% to about 20% by weight manganese(II) chloride, each based on the weight of the activated carbon carrier. In a particularly preferred embodiment, tbe catalyst comprises activated carbon as the carrier material impre9nated with about 16% by weight of copper(II) chloride and about 16% by weight of manganese(II) chloride based on the we:ght of activated carbon.

In the first adiabatic reaction zone, the volumetric flow velocity relative to standard conditions, is about 2000 to about 6000 parts by volume of hydrogen chloride gas per part by volume of catalyst per hour, preferably about 3000 to about 5000 h$^{-1}$.

In the second stage of the process, the chlorine excess is removed from the product stream of the first reaction zone, which comprises hydrogen chloride, chlorination products and chlorine. The reaction mixture from the first reaction zone is contacted in a second adiabatically operated reaction zone using the same transition metal chloride impregnated activated carbon catalyst system as in the first stage, at temperatures from about 80 to about 180° C., preferably about 110 to about 130° C., with olefins or chloroolefins which are gaseous under atmospheric pressure and both under atmospheric temperature range from about −50° C. to about +10° C. The olefins or chloroolefins are here employed in such an excess relative to the chlorine, that about 100 to about 1500 ppm by volume, preferably about 500 to about 1000 ppm by volume, remain in the hydrogen chloride stream leaving the reactor, after the reaction has taken place.

The olefins or chloroolefins preferably include propylene, 1-butene, cis-2-butene, trans-2-butene, 1,3-butadiene and vinyl chloride Vinyl chloride is particularly preferred.

In the second reactor, the space flow velocity, relative to standard conditions is about 5000 to about 10,000 parts by volume of hydrogen chloride gas per part by volume of catalyst per hour, preferably about 6000 to about 8000 h$^{-1}$.

In the last process step, the reaction mixture of the second stage is separated by low temperature pressure rectification that is, the hydrogen chloride is separated from the chlorination products and the excess olefins or chloroolefins. After cooling, the reaction mixture is rectified in a column at a bottom temperature from about 50 to about 80° C. under a pressure from about 7 to about 15 bar absolute, preferably about 9 to about 14 bar absolute. The bottom temperature is maintained within the above-mentioned temperature range by an appropriate bottom drain and by an addition of substances having a suitable boiling point respectively. Preferably, vinyl chloride is added for setting the required bottom temperature. The pure hydrogen chloride is partially condensed at the top of the column at about −20° C. to about −40° C. and returned as liquid reflux to the column. The remaining part of the hydrogen chloride preferably leaves the column in gaseous form.

The process according to the invention makes it possible to reduce the impurities which interfere in the preparation of silicon containing compositions in the hydrogen chloride from a pyrolysis 1,2-dichloroethane to values of less than about 1 ppm by volume (cm$^3$ per m$^3$), without increasing the inert gas content. Using the hydrogen chloride purified according to the process of the invention, it is possible to produce trichlorosilane of high purity without waste gas problems or environmental problems. Carbon problems do not arise in conversion of the trichlorosilane to highly pure semiconductor silicon.

The invention is explained in yet further detail by reference to the example which follows and to the Figure. The volumes given have been converted to standard conditions (1.013 bar, 0° C.).

EXAMPLE 3500 m$^3$/h of hydrogen chloride from pyrolysis of 1,2-dichloroethane, contaminated by 2500 ppm by volume of acetylene, 150 ppm by volume of ethylene 5 ppm by volume of vinyl chloride and 2 ppm by volume of ethyl chloride entered the process through line 1 under a pressure of 8 bar absolute. The hydrogen chloride was preheated in a steam-heated heat exchanger 2 to a temperature of 160° C. After the addition of 21.5 m$^3$/chlorine gas through line 3 under a pressure of 8.5 bar absolute, the mixture passed through line 4 to reactor 5 which was filled with 0.8 m$^3$ of activated carbon coated with 16% by weight of CuCl$_2$ and 16% by weight of MnCl$_2$. The reactor was operated adiabatically. In reactor 5, the reaction between acetylene, ethylene and vinyl chloride with chlorine to give 1,1,2,2-tetrachloroethane, 1,2-dichloroethane and 1,1,2-trichloroethane occurred. The reaction mixtures left the reactor 5 through line 6. The reaction mixture contained an excess of free chlorine of 985 ppm by volume, measured at 7. The concentration of acetylene and ethylene were each below 1 ppm by volume. Six m³/h of vinyl chloride gas under a pressure of 8 bar absolute were admixed with the HCl at 8, the reaction mixture flowed at a temperature of 125° C. under a pressure of 7.5 bar absolute via line 8a to reactor 9, which was filled with 0.5 m³ of the same carrier catalyst as in reactor 5 and was operated adiabatically,too. In reactor 9, the free chlorine in the hydrogen chloride stream after reactor 5 reacted with the vinyl chloride to produce 1,1,2-trichloroethane.

Thr reaction mixture left the reactor 9 free of chlorine by line 10 with a vinyl chloride content of 725 ppm by volume, measured at 11. The reaction mixture was cooled to about 30° C. in heat exchanger 12 cooled by ter and then compressed in compressor 13 from 7 bar absolute to a pressure of 14 bar absolute.

After the temperature of the gas stream was reduced in water cooler 14 and after further intense cooling in countercurrent heat exchanger 15, where the chlorination products formed in the two reactors and also excess vinyl chloride were at least partially condensed and collected via the lines 14a and 15a in tank 16, the hydrogen chloride stream passed by line 26 to rectifying column 25. Vinyl chloride was added intermittently by means of the pump 18 through line 17 to the tank 16. About 20 kg/hr of the liquid, temporarily stored in tank 16 consisting mainly of vinyl chloride, were continuously pumped by means of pump 20 via line 19 into the bottom of column 25 in order to maintain the bottom level constant. To maintain a bottom temperature of about 75° C., about 20 kg/hr of bottom product were removed through lines 24a and 24 and, after cooling in the water cooler 21, were discharged through line 37 to work up in a separate distillation which is not shown. Column 25 was heated by 2.2 bar steam, by doing which the bottom product recirculated through lines 24a, 23 and the boiler 22. At the top column 25, gaseous nydrogen chloride was recovered which was passed through line 27 to condenser 28 charged with a coolant such as Frigen-12.

The liquid coolant was fed by line 34, and then warmed and vaporized; gaseous coolant flowed back through line 35 to a refrigeration compressor (not shown). In the condenser 28, partial condensation took place at −24° C. under a column, top pressure of 13.5 bar absolute About 2000 kg/hr of liquified hydrogen chloride were obtained.

The liquid hydrogen chloride flowed through line 29 into the receiver 30 and was charged as reflux to the column 25 via line 32 by means of the pump 31 . The purified hydrogen chloride left the purification unit in the form of a gas through line 33 and countercurrent heat exchanger 15, in which cold hydrogen chloride at −24° C. was warmed by heat exchange with crude hydrogen chloride at about 30°, and was discharged with the following purity at 36 to the silicon plants:

| | |
|---|---|
| acetylene | <1 ppm by volume |
| ethylene | <1 ppm by volume |
| vinyl chloride | <1 ppm by volume |
| ethyl chloride | <1 ppm by volume |
| chlorine | not detectable |
| hydrogen chloride | balance |
| chlorination products | <1 ppm by volume |

The bottom product of the rectification column 25 contained the chlorination products of 1,2-dichloroethane, 1,1,2-trichloroethane and 1,1,2,2-tetrachloroethane, in addition to vinyl chloride and ethyl chloride.

What is claimed is:

1. A process for purifying a hydrogen chloride mixture containing acetylene and ethylene which comprises:
  (a) reacting the hydrogen chloride mixture at a temperature of from about 120° C. to about 220° C., at a pressure of from about 5 to about 20 bar absolute in contact with a catalyst comprising activated carbon impregnated with at least one transition metal chloride in the presence of an amount of chlorine to provide a first hydrogen chloride reaction mixture containing from about 100 ppm to about 2000 ppm by volume of free chlorine;
  (b) reacting the first hydrogen chloride reaction mixture containing from about 100 to about 2000 ppm by volume of free chlorine, at a temperature of from about 80° C. to about 180° C. with at least one member selected from the group consisting of olefins and chloroolefins, said olefins and chloroolefins being gaseous under atmospheric pressure and which boil under atmospheric pressure in a temperature range of from about −50° C. to about 10° C., in contact with activated carbon impregnated with at least one transition metal chloride to form a second reaction mixture wherein the olefin and/or chloroolefin are present in the second reaction mixture after the reaction in an amount of from about 100 to about 1500 ppm by volume;
  (c) rectifying the second reaction mixture in a column under a pressure of from about 7 to about 15 bar, hydrogen chloride from the top of the column being partially condensed and the partial condensate returned as reflux to the column, the temperature at the bottom of the column being maintained at about 50° C. to about 80° C., and
  (d) recovering the purified hydrogen chloride.

2. The process according to claim 1 wherein the catalyst used in steps (a) and (b) comprises activated carbon impreganted with up to about 40% by weight, based on activated carbon of at least one transition metal chloride.

3. The process according to claim 2 wherein the activated carbon is impregnated with from about 10 to about 20% by weight of copper(II) chloride and from about 10 to about 20% by weight of manganese(II) chloride based on the weight of activated carbon.

4. The process according to claim 1 wherein the catalyst used in (a) and (b) consists essentially of activated carbon impregnated with about 16% copper(II) chloride and about 16% by weight of manganese(II) chloride.

* * * * *